United States Patent
Rodgers

(10) Patent No.: US 7,003,713 B2
(45) Date of Patent: Feb. 21, 2006

(54) VARIABLE HAMMING ERROR CORRECTION FOR A ONE-TIME-PROGRAMMABLE-ROM

(75) Inventor: Steve Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 458 days.

(21) Appl. No.: 10/147,758

(22) Filed: May 16, 2002

(65) Prior Publication Data
US 2003/0217322 A1 Nov. 20, 2003

(51) Int. Cl.
*G11C 29/00* (2006.01)
(52) U.S. Cl. .................................. 714/768; 714/764
(58) Field of Classification Search ............... 714/763, 714/777, 6, 768, 764, 733, 737, 774, 742; 711/164, 103; 365/200; 716/16
See application file for complete search history.

(56) References Cited

U.S. PATENT DOCUMENTS

| | | | |
|---|---|---|---|
| 4,345,319 A * | 8/1982 | Bernardini et al. ..... | 365/189.02 |
| 4,965,828 A * | 10/1990 | Ergott et al. ................. | 713/193 |
| 5,671,146 A * | 9/1997 | Windel et al. ............... | 705/410 |
| 5,905,854 A * | 5/1999 | Nielson et al. ................. | 714/6 |
| 6,024,486 A * | 2/2000 | Olarig et al. ................ | 714/763 |
| 6,219,789 B1 * | 4/2001 | Little et al. .................. | 713/200 |
| 6,412,072 B1 * | 6/2002 | Little et al. .................. | 713/200 |
| 6,446,177 B1 * | 9/2002 | Tanaka et al. .............. | 711/163 |
| 6,459,648 B1 * | 10/2002 | Hogan et al. ............ | 365/230.06 |
| 6,466,512 B1 * | 10/2002 | Hogan et al. ............... | 365/239 |
| 6,690,595 B1 * | 2/2004 | Srinivasan et al. ........... | 365/49 |
| 6,717,222 B1 * | 4/2004 | Zhang .......................... | 257/390 |
| 6,744,681 B1 * | 6/2004 | Hogan ......................... | 365/200 |

* cited by examiner

*Primary Examiner*—Albert DeCady
*Assistant Examiner*—Mujtaba Chaudry
(74) *Attorney, Agent, or Firm*—Garlick, Harison & Markison, LLP

(57) ABSTRACT

A one-time-programmable (OTP) module includes OTP memory and OTP input/output (I/O) that performs error correction operations. The OTP module may be used in a data communications system. The error correction operations operate according to one of a plurality of supported coding schemes. In one embodiment, the error correction operations are based upon Hamming code operations. The coding scheme employed by the error correction operations is set by a code control input. The code control input is chosen based upon the inherent quality of the OTP memory. The OTP module may thus be incorporated into any of a variety of processes, each of which has its own OTP memory quality.

2 Claims, 7 Drawing Sheets

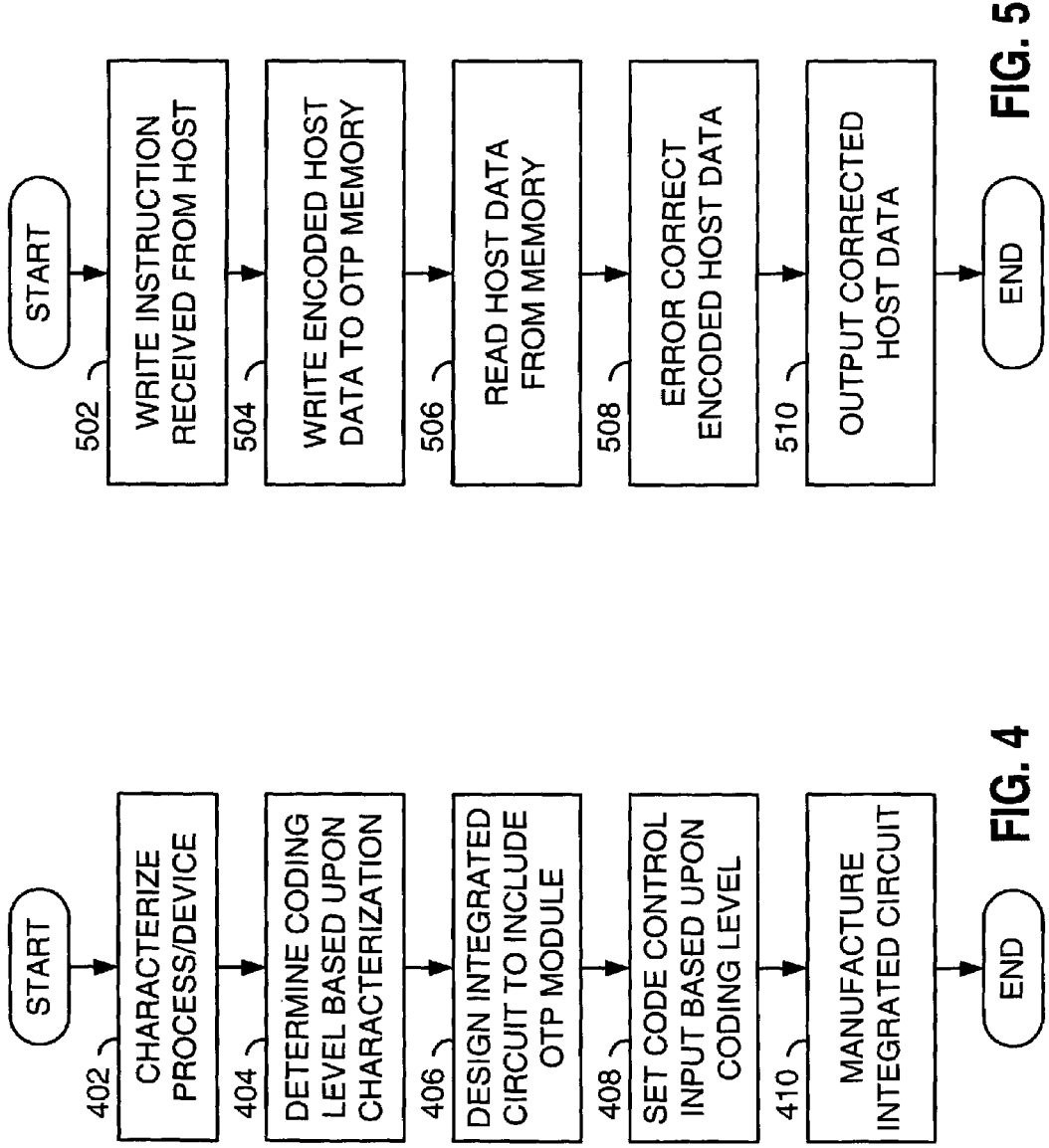

VARIABLE HAMMING ERROR CORRECTION FOR A ONE-TIME-PROGRAMMABLE-ROM

FIELD OF THE INVENTION

The present invention relates to the field of electronic device identification. More specifically, the present invention relates to correction of data errors in solid-state devices, such as one-time-programmable devices, used in data communications systems.

BACKGROUND OF INVENTION

In recent years, there has been a rapid expansion in the range of data communications and entertainment services available to consumers. For example, in addition to traditional television services, consumers can now receive a wide variety of video and audio services via cable and other terrestrial transmission media and also via direct satellite broadcast. There has also been a rapid expansion in the types of telephone and Internet services that can be delivered via cable or digital subscriber line transmission media.

A "set top box" (often placed on top of a TV set) provides customers with a centralized control center for integration and control of data and entertainment services. Set top boxes require signal processing circuits that are capable of processing radio-frequency (RF) signals, baseband signals, and digital signals. Typically, the components used in the set top box to perform RF signal processing and baseband processing were either formed from discrete components or formed in a bipolar or bipolar-Complementary Metal Oxide Semiconductor process (bipolar/CMOS process). Components of these types worked well in meeting the high demands of the set top box. However, these components were expensive to produce and typically required that the set top box include a large number of circuit components.

In order to address these shortcomings, it is desirable to fully service the requirements of the set top box with a very small number of integrated circuits (one integrated circuit in a fully minimized installation) that are formed in a CMOS process. Integrated circuits formed in CMOS processes are inexpensive, consume very little power, and generate very little heat. However, integrated circuits formed in CMOS processes often have higher rates of component mismatches, increased temperature-related variations, and other process variations. Therefore, factors such as noise, data transmission errors and non-linearity are generally more common in integrated circuits manufactured using CMOS processes.

One particular problem relating to the use of CMOS integrated circuits in set top boxes relates to the unit identification. Set top boxes are typically programmed with a unique identity. This unique identity is used by a corresponding service provider to enable the functionality of the set top box when deployed, to identify data retrieved from the set top box for billing purposes, and for other operational purposes relating to the set top box. This unique identity (and other information that is programmed a single time into the set top box) is stored in a One-Time-Programmable-Read-Only-Memory (hereafter referred to as OTP memory). Other devices such as cell phones, network cards, and other electronic devices also require identification that is stored in this manner.

When the components of the set top box are formed in CMOS processes, the OTP memory is also formed in the CMOS process. However, as is generally known, memory of the write-once/read-many type formed in CMOS processes is oftentimes not fully reliable. Such memory may include bad cells when constructed. If data is written to these bad cells, data read from these bad cells is also bad. Further, write-once/read-many memories formed in CMOS processes typically degrade over time such that, even though the cells are generally good when constructed, memory will be lost over time. The robustness of this type of memory formed in a CMOS process varies with the process and, unfortunately, is oftentimes not known until integrated circuits are formed and a particular percentage of the integrated circuits have failed due to failure of an OTP memory contained therein.

Unfortunately, when OTP memory becomes even partially non-functional, the operation of a corresponding device, e.g., set top box, is adversely affected. These same problems occur when an OTP memory is used to identify other types of devices, e.g., cell phones, network cards, personal computers, etc. Thus, there is a need for an OTP memory that overcomes problems relating to bad memory cells.

SUMMARY OF THE INVENTION

An error correction method and apparatus constructed according to the present invention is used to correct data errors occurring in one-time-programmable (OTP) devices. In one embodiment, the error correction scheme is based on Hamming encoding with the error correction logic being bundled on the same integrated circuit as the OTP, thus providing an overall system that has enhanced reliability. The OTP with the error correction provided in accordance with the present invention allows increased reliability for devices used for data communications, particularly set top boxes used to integrate the wide range of data and entertainment services An OTP module of the present invention is broadly comprised of an OTP read only memory (ROM) and a host interface that is operably coupled to the host, that receives encoded host data from the host integrated circuit and that provides a copy of corrected host data to the host integrated circuit. Write path circuitry is operably coupled to the OTP ROM and to the host interface, wherein the write path circuitry receives encoded host data from the host interface and writes the encoded host data to the OTP ROM. Read path circuitry is operably coupled to the OTP ROM and to the host interface, wherein the read path circuitry reads encoded host data from the OTP ROM, detects errors in the encoded host data, corrects the encoded host data to produce corrected host data, and provides the corrected host data to the host interface. A code control input causes the write path circuitry and the read path circuitry to enact one of a plurality of supported coding schemes to correct data errors in accordance with a Hamming code error correction protocol.

Another embodiment of the present invention comprises a method of designing and manufacturing an integrated circuit that includes a host integrated circuit and an OTP module. The method is broadly comprised of the steps of determining the characteristics of a process that will be employed to construct the integrated circuit; designing the host integrated circuit; and incorporating the OTP ROM into the integrated circuit to form a completed integrated circuit design. The characteristics of the process that will be used to construct the integrated circuit is used to determine the coding level, i.e., the combination of data bits and parity bits, to be used to correct errors in the data stored in, and retrieved from, the OTP. The coding can be set to a predetermined parameter to enable a higher error correction level to overcome errors related to bad memory cells or other errors related to process and operating variations. A control parameter to determine the coding level can be set by a hard wire connection during the fabrication process, by a jumper setting after the fabrication process or by a signal from the host integrated circuit during operation of the system.

The error correction provided by the present invention can be migrated easily to differing amounts of overhead and performance as the OTP reliability improves with successive iterations of manufacturing. The migration to larger word widths can be accomplished with a single parameter change, and frees up more OTP data storage as process reliability improves.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 is a logic diagram illustrating process steps employed for fabricating an integrated circuit that incorporates an OTP module constructed according to the present invention.

FIG. 5 is a logic diagram illustrating process steps employed for providing host data to a host according to the present invention.

DETAILED DESCRIPTION

Figure 1A:
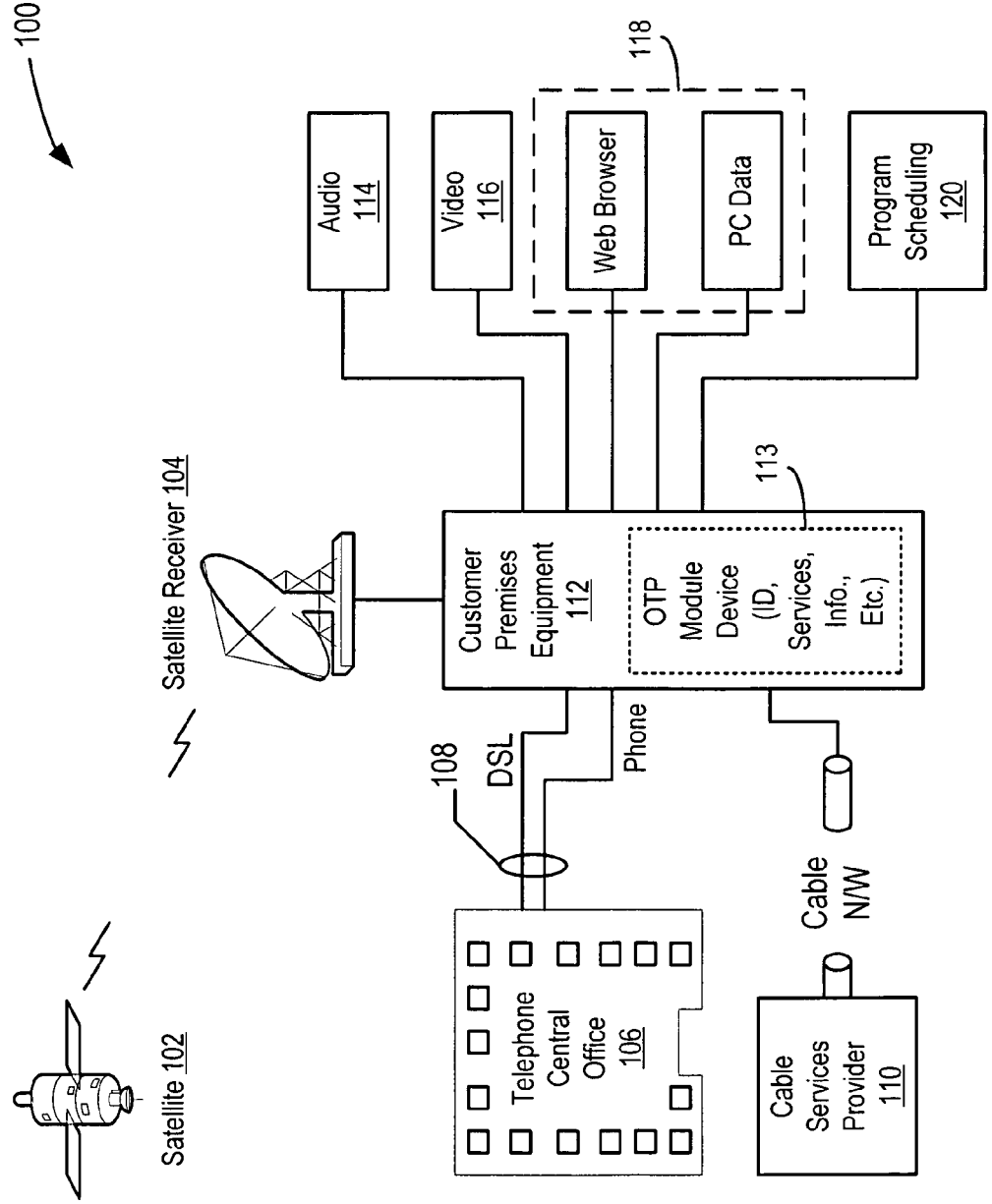
FIG. 1A is an illustration of a data communications system that provides a plurality of data and entertainment services to a customer using a set top box to integrate and coordinate service delivery.

FIG. 1A illustrates a schematic block diagram of a communications system 100 that provides a plurality of data and communication services to a customer. Representative services shown in FIG. 1 include broadcast services transmitted by a satellite 102 and received by a satellite receiver 104. The services may also include communications services provided by a telephone central office 106, including Digital Subscriber Line (DSL) services and phone services delivered to the customer via appropriate transmission media 108 that may include optical fiber, coaxial cable or standard twisted pair copper wires. A cable services provider 110 that typically delivers communications data to the customer via coaxial cable may also provide the services. The services provided by the delivery media 108 listed above are not exhaustive of all possible provider topologies, but rather are merely representative of the plurality of service delivery mechanisms available to the customer. For example, various other wireless and terrestrial delivery systems might be employed for delivery services as will be understood by those skilled in the art.

Each of the data communications service sources listed above is connected to the set top box 112, which will sometimes be referred to as a customer-premises equipment (CPE) 112. The CPE 112 can be used to control the operation of a plurality of devices, including audio equipment 114, video equipment 116, PC data/Internet connectivity equipment 118 and programming scheduling equipment 120. The customer-premises equipment comprises appropriate data storage, which may comprise a one-time-programmable (OTP) module 113 that is operable to store information relating to a device identifier associated with the CPE 112 or other operational information relating to the system.

For the CPE 112 to function properly, it is essential that the data that was written once to the OTP module 113 be read back from the OTP module 113 in an error free format each and every time that the data is read from the OTP module 113. Because OTP memory may include bad memory cells and/or the memory cells of the OTP memory may lose data over time, such a goal is not easily met. Thus, according to the present invention, the OTP module 113 includes error correction operations. With these error correction operations, data received from the host, i.e., CPE 112, is encoded and stored in the OTP memory. Then, upon access from the OTP memory, data that is read is error corrected prior to writing the data to the host.

One technique used with the OTP module 113 of the present invention for correcting data errors involves the use of Hamming codes. Hamming codes have been used in communications systems to correct for occasional bit errors that may be introduced in the communications link. Like most error correcting schemes, Hamming encoding involves a fundamental trade-off between overhead (the amount of extra bits required to allow the error correction) and error-correction performance (the number of errors which can be corrected). A common error-correcting configuration is (7,4), which involves an overhead of 3 bits for every 4 data bits, and which allows one error every 4 bits to be corrected. Such configuration is said to be "perfect" in that it exactly satisfies the equation:

$$(\text{Data bits})+1<=2^{parity\ bits}-(\text{parity bits})$$

Perfect configurations allow the maximum number of data bits for a given number of parity bits to be transmitted. However, in practice, other "non-perfect" schemes are often desirable so that the number of encoded data bits ends on a byte boundary, such as (12,8) or (21,16). In any case, the size of the data portion of the word (the second number in the parenthesis) will usually depend on the expected error rate, since only one error can be corrected every N bits, where N is the data word size.

In communication systems, the expected error rate can often be evaluated through knowledge of the channel characteristics. In the case of new processes, however, the expected error rate may be completely unknowable until the design is finished. Such is the case with OTP memory commonly used in set top box systems. As opposed to communication channels, the expected error rate of the OTP memory is difficult to characterize before it has been implemented for the first time in a silicon process. Also unlike communication channels, errors in the stored OTP memory are expected to occur over time, i.e., to increase with the age of the device. In addition, subsequent process improvements might be able to reduce or eliminate OTP memory errors.

Thus, the OTP module 113 of the present invention supports a plurality of coding schemes, each of which provides its own level of robustness. For applications in which the OTP memory is not expected to have errors, the OTP module 113 may be operated to provide no error correction operations. However, for other applications in which the OTP memory is subject to errors, an appropriate level of error coding may be employed so that an appropriate level of expected OTP memory errors may be corrected. These various operations will be further described hereinafter.

Figure 1C:
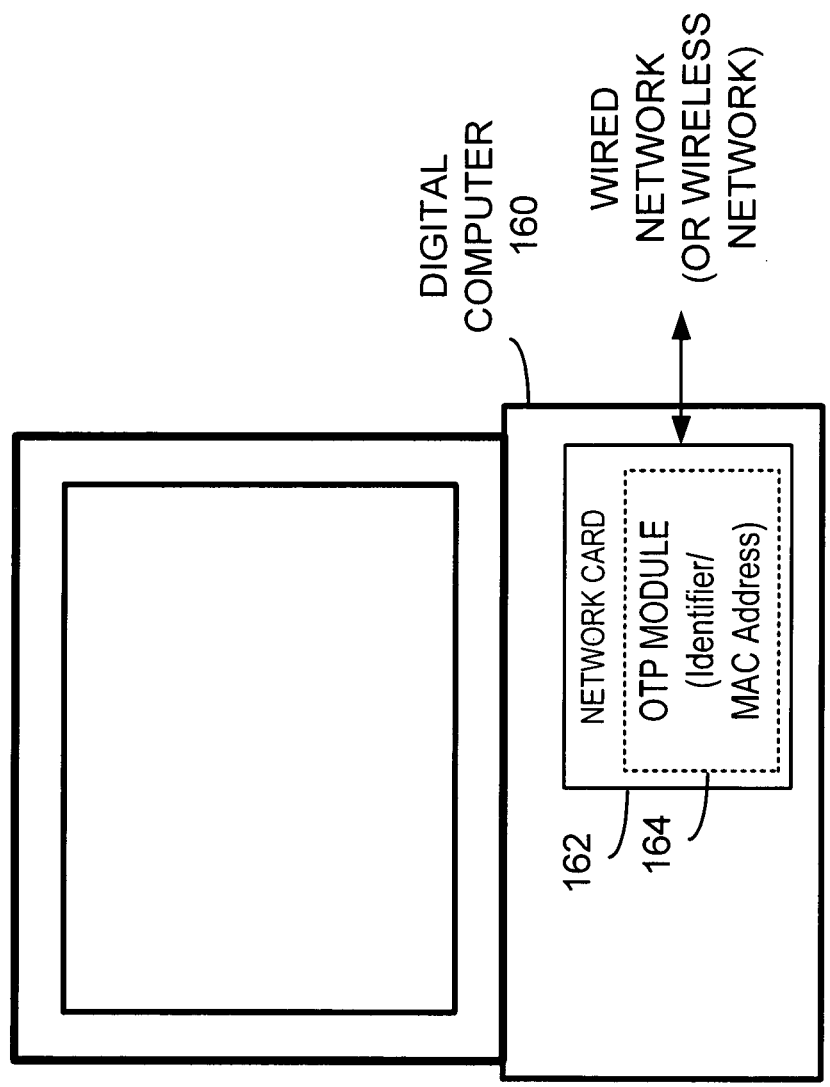
FIG. 1C is an illustration of a digital computer including a network interface incorporating an OTP module for storing identifier information relating to the network interface of the computer.
Figure 1B:
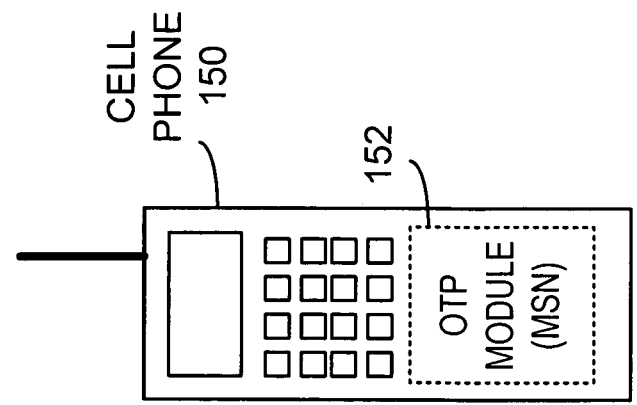
FIG. 1B is an illustration of a cellular telephone incorporating a one-time-programmable (OTP) module for storing identifier information relating to the telephone.

Numerous other devices may also incorporate the OTP module of the present invention to store information relating to a device identifier or other system information. For example, FIG. 1B is an illustration of a cellular telephone 150 including an OTP module 152 for storing a mobile identification number, sometimes referred to as the electronic identifier number (EIN), and other system information relating to operation of the cell phone. FIG. 1C is an illustration of a digital computer 160 incorporating a network interface 162 that includes an OTP module 164 for storing the network interface identifier code and information relating to the media access controller (MAC) address for the network interface. It will be apparent to those skilled in the art that there are numerous other devices, in addition to the specific examples listed above, that can incorporate an OTP module for storing accurate identifier data and system operation data in accordance with the present invention.

Figure 2A:
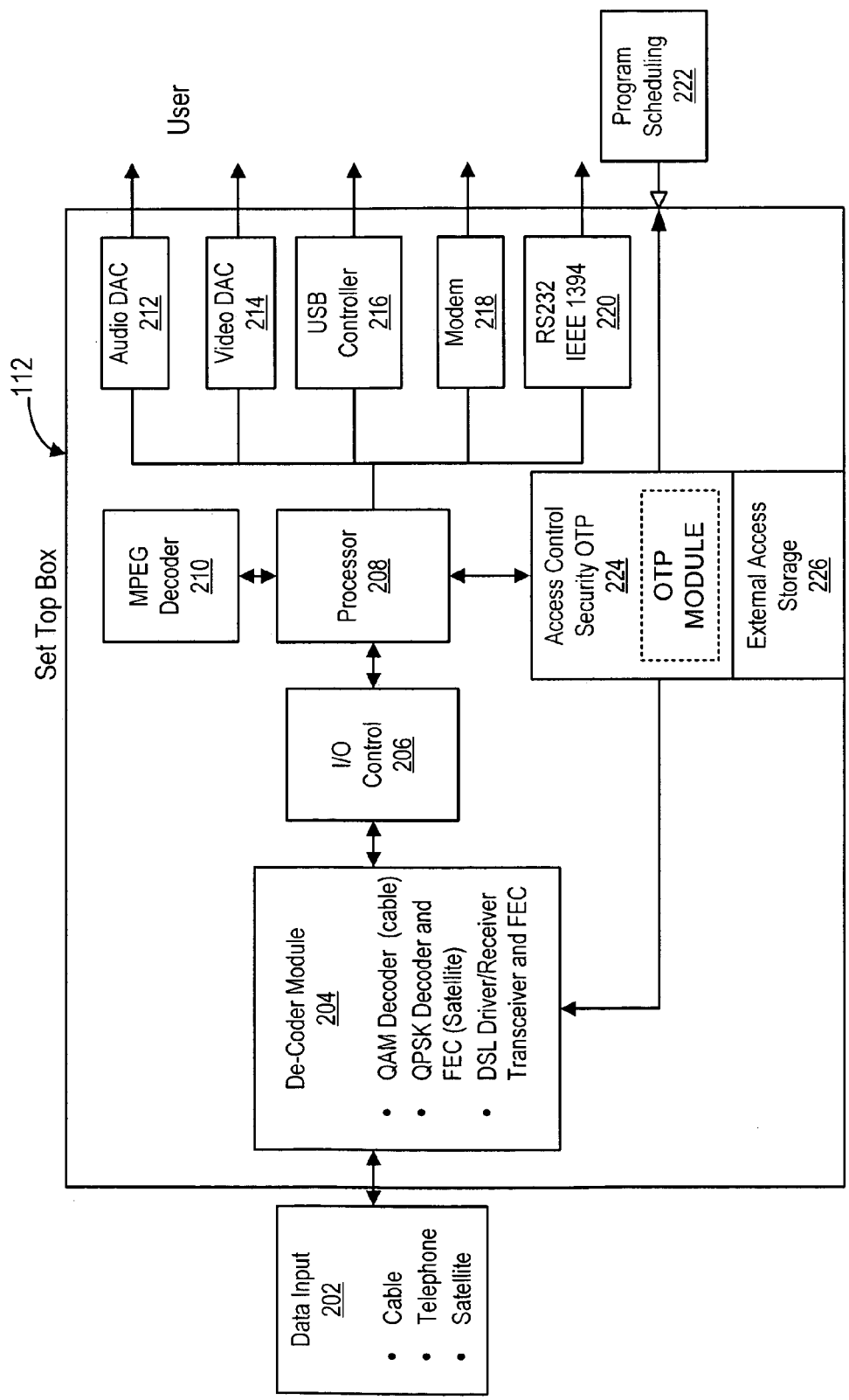
FIG. 2A is a functional block diagram of the internal components of a set top box for integrating and controlling the delivery of data and entertainment services to a consumer.

FIG. 2A is a functional block diagram of a set top box 112 that includes an OTP module constructed according to the present invention. The set top box 112 is operable to receive a plurality of data inputs 202 which may include data services from cable providers, telephone service providers or satellite service providers. The various data inputs are received by the decoder module 204 and include processing circuitry for QAM decoders (for cable data), QPSK (for satellite data transmissions) or DSL Driver/Receiver functions for data services transmitted over telephone transmission media. The Input/Output (I/O) control module 206 coordinates data flow between the decoder module 204 and the processor 208.

The processor 208 is operable to process the incoming data and to correlate incoming data signals with access and security information stored in the access control security OTP module 224. The programmed data stored in the Access Control Security OTP module 224 can be augmented by additional access and control data stored in external access storage 226 that may be a PCMCIA card, Smart Media card, or other appropriate solid-state memory device.

An MPEG Decoder 210 is operably connected to the processor 208 and provides decoding of incoming video and audio signals that employ MPEG compression. The processor 208 directs processed data signals to a plurality of output ports for use by external devices. For example, audio signals are directed to an audio digital-to-analog converter (DAC) 212 and video signals are directed to video DAC 214. Data signals can be transmitted to and received from external devices via a plurality of ports, including a universal serial bus (USB) 216, a modem 218 and RS232 (and/or IEEE 1394) serial port 220. Program scheduling data 222 and other user inputs can be received and authenticated by an access control security OTP module 224.

The access control security OTP module 224 contains embedded program data that allows the set-top box to be uniquely identified for purposes of receiving customized data and entertainment services from the various service providers. It is essential that data read from the OTP module 224 be error-free as compared to the data that was written to the OTP module 224. Otherwise, the customer may have access to unauthorized data or may not have access to authorized data services.

While many set top boxes employ a plurality of separate circuit modules to provide the signal processing functions illustrated in FIG. 2A, it is desirable to integrate these functions into a single integrated circuit or a very small number of integrated circuits. The OTP module 224 provides stored error-correcting protocol that allows the OTP module 224 to provide accurate identification and authentication as described in more detail below.

Figure 2B:
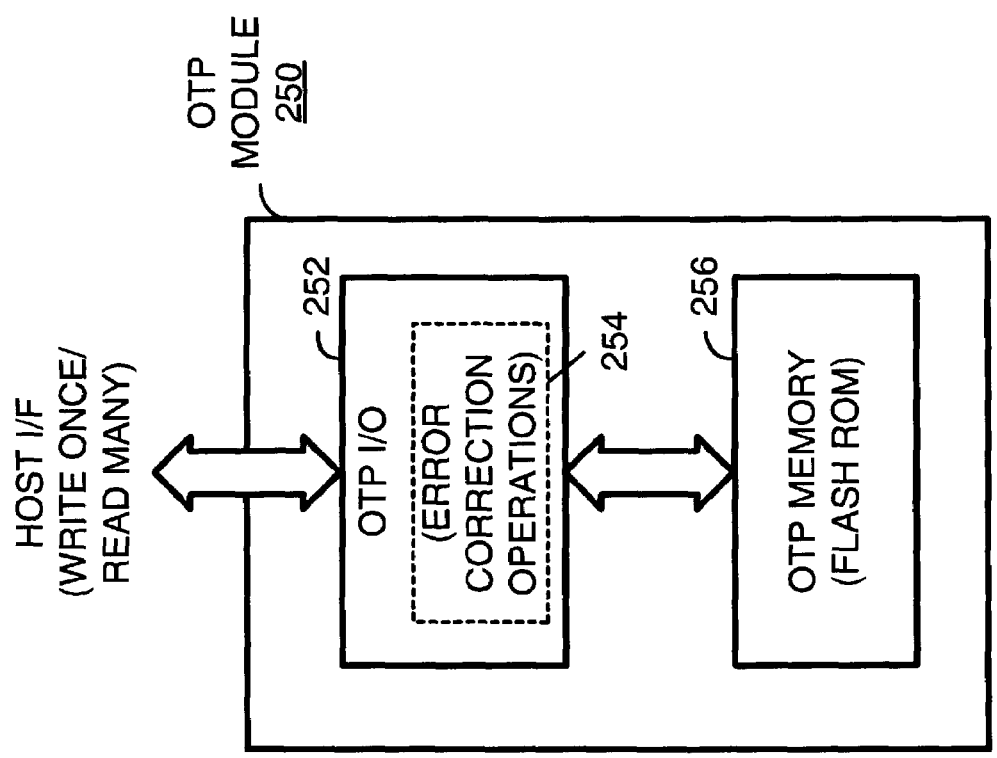
FIG. 2B is a functional block diagram of an OTP module constructed according to the present invention.

FIG. 2B is a functional block diagram of an OTP module 250 constructed according to the present invention. The OTP module 250 comprises an OTP input/output (I/O) interface 252 that includes embedded data processing functions to perform error correction operations 254 and an OTP memory 256 that may be a flash ROM. In the configuration illustrated in FIG. 2B, the program data corresponding to the identifier code (or other system information) is written to the OTP module 250 one time during initial programming. The manufacturer of a device that includes the OTP module 250 may perform this programming. Alternately, a service provider that deploys the device that includes the OTP module 250 may program the device. Then, as is required for its continued operation, the device accesses the OTP module 250 to retrieve the written-once data.

Figure 2C:
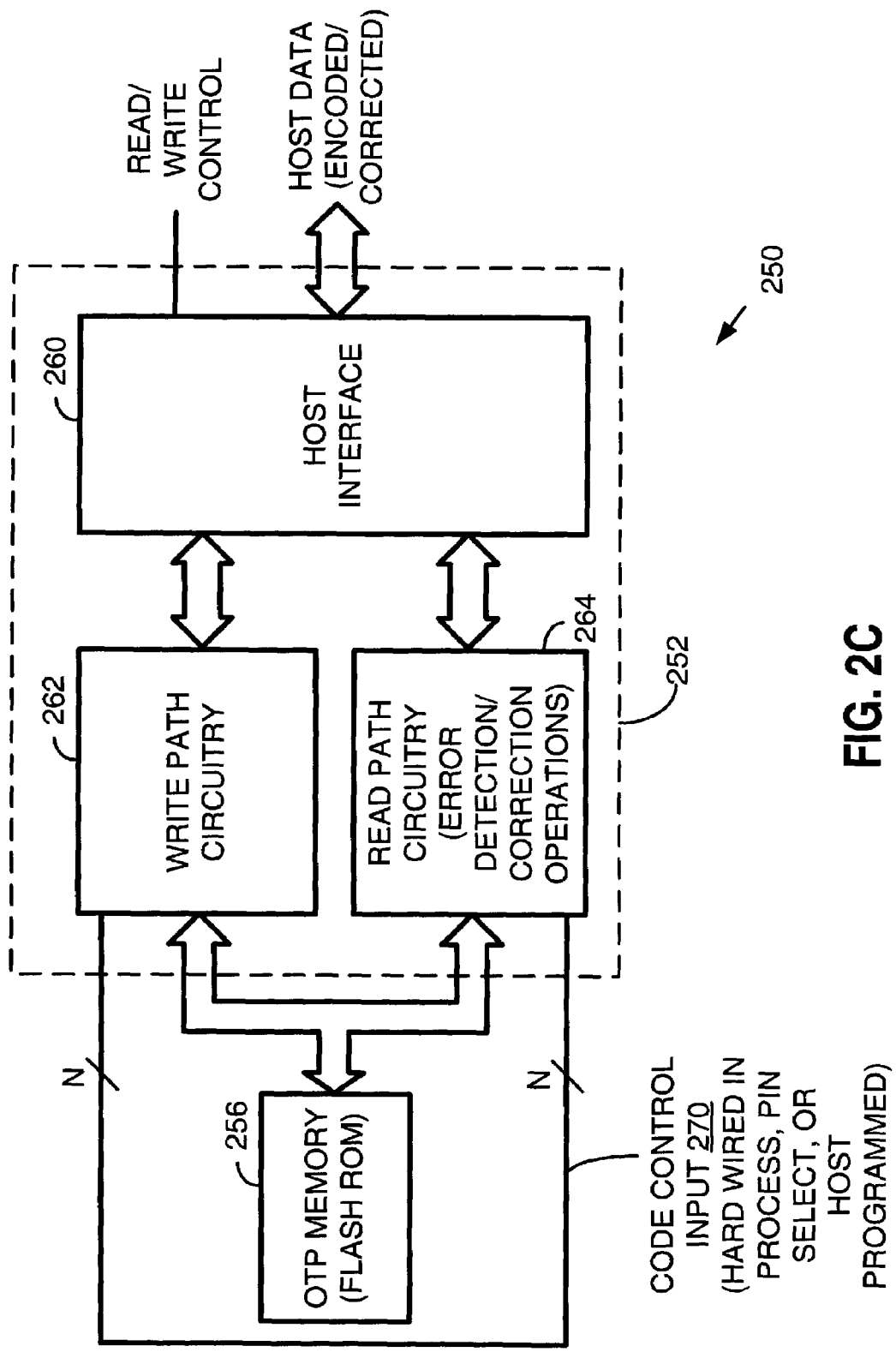
FIG. 2C is a functional block diagram illustrating in more detail the internal components of the OTP module of FIG. 2B.

FIG. 2C is a functional block diagram illustrating in more detail the internal components of the OTP module 250 of FIG. 2B. As shown, the OTP module 250 includes the OTP memory 256 and the OTP I/O 252. The OTP I/O 252 includes a host interface 260 that is operable to receive encoded host data from the host and to write corrected host data to the host. The OTP module 250 is also addressable and includes an address input as well.

The OTP I/O 252 further includes write path circuitry 262 and read path circuitry 264, both of which communicatively couple to the OTP memory 256. Encoded host data is written into the OTP 256 by the host software. During a write operation (one time for each OTP memory 256 location) the host interface 260 receives encoded host data, and passes the encoded host data to the write path circuitry 262. The write path circuitry 262 receives the encoded host data and writes the encoded host data to the OTP memory 256.

During a read operation, the host interface 260 requests the read path circuitry 264 to access particular encoded host data. In response to this request, the read path circuitry 264 reads corresponding encoded host data from the OTP memory 256, performs error detection operations upon the encoded host data read from the OTP memory 256, corrects the encoded host data if errors are present to produce corrected code data, and passes the corrected host data to the host interface 260. The host interface 260 then writes the corrected host data to the host via the host data interface. The OTP 250 also provides status signals to the host to indicate that error correction has occurred.

The code control input 270 controls the error coding/error detection/error correction operations of the write path circuitry 262 and the read path circuitry 264. In one embodiment, the code control input 270 controls the number of parity bits used by the write path circuitry 262 and the read path circuitry 264 during the read and write coding functions. The code control input 270 used during read and write coding functions can be hard wired during the fabrication of the respective modules or can be pin selected or host programmed subsequent to fabrication of the device.

The write path circuitry 262 and the read path circuitry 264 also perform data width conversion to convert between the data width of the encoded host data and the data width of the OTP memory 256. The OTP memory 256 has a first physical data width, e.g., one byte, while the encoded host data has a second (and generally different) data width. The number of data bits plus the number of parity bits determines the data width of the encoded host data. For example, in (21, 16) Hamming encoding, the encoded host data is 21 bits wide with 5 bits of parity and 16 bits of data. The encoded host data must be "packed" into the physical OTP memory. The read path circuitry is operable to read parallel format encoded host data from the OTP memory 256 at the first data width, to then convert the parallel format encoded host data to serial format encoded host data and to convert the serial format encoded host data to parallel format encoded host data at the second data width. The write path circuitry is operable to convert parallel format encoded host data at the second data width to serial format encoded host data, to then convert the serial format encoded host data to parallel format encoded host data at the first data width and to write the parallel format encoded host data to the OTP memory at the first data width.

Figure 3:
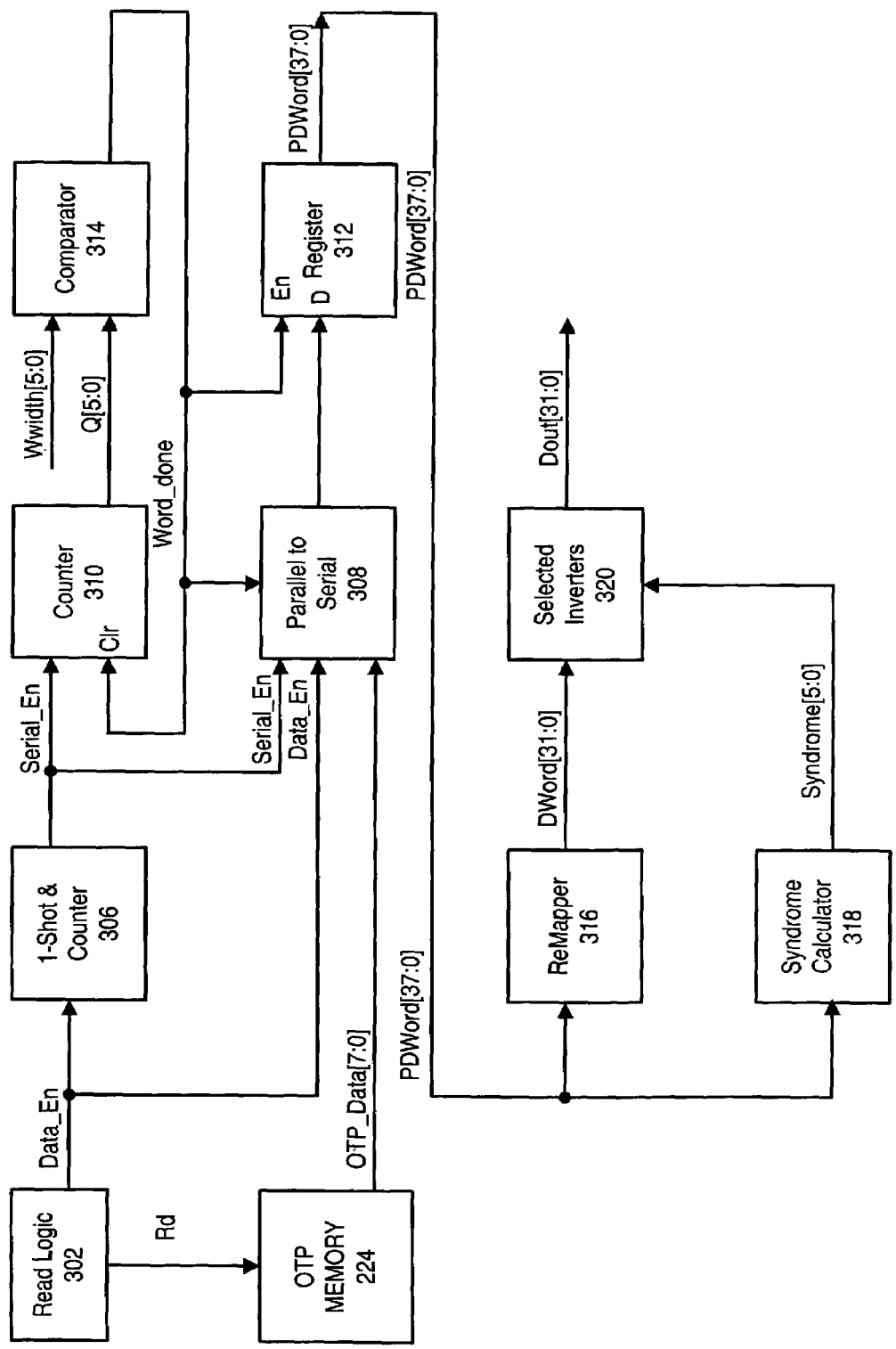
FIG. 3 is a block diagram illustrating one embodiment of read path circuitry of the OTP module of FIG. 2C.

FIG. 3 is a block diagram illustrating one embodiment of read path circuitry of the OTP module of FIG. 2C. Read logic 302 generates a read signal that causes the OTP memory 224 to provide an output comprising one byte of data (OTP memory 224 data width). Multiple bytes may be read, one after another, depending on the number of data bits in the error correction scheme. The read logic 302 also generates a data enable signal that is received by the 1-shot & counter 306 and the parallel-to-serial converter 308. The 1-shot & counter 306 generates a serial enable signal that is provided to counter 310 and to parallel-to-serial converter 308. Data is read out of the OTP 224 and immediately converted to serial format by the parallel-to-serial converter 308. Although the data arriving from the OTP device is in byte format, the output data word can be any size from 7 (4 bit data word plus 3 bits parity) to 38 (32 bit data word plus 6 bits parity). In FIG. 3, the bus Wwidth [5:0] represents the width of the data and parity bits for the incoming Hamming encoded host data. A serial enable signal from the 1-shot & counter 306 goes high for 8 clock periods after the data byte arrives at the parallel to serial converter 308, and this serial enable is used both to shift the incoming data into the shift register 312, and to enable the counter 310. A comparator 314 receives the output of the counter 310 and compares that value to the word width specified in the Wwidth [5:0]. When the output of the counter 310 equals the word width specified in Wwidth [5:0] (i.e., when the number of bits received is equal to a complete data word plus parity), a clear signal is generated by the comparator 314 and the counter 310 is reset to 0, the shift register 312 is cleared to 0, and the last value of the shift register 312 is latched into a register. The operation of clearing the shift register after the correct number of bits has arrived ensures that the upper unused bits of the shift register will always be 0, since it is reset before data can be shifted into these upper bit locations. The fact that these bits are 0 also ensures that the syndrome will never be set for the upper bits, essentially guaranteeing that the syndrome will be "correct" for the given word size. This can be seen from the following syndrome equations:

$S0: d1 \wedge d3 \wedge d5 \wedge d7 \wedge d9 \wedge d11 \wedge d13 \wedge d15 \wedge$
$\quad d17 \wedge d19 \wedge d21 \wedge d23 \wedge d25 \wedge d27 \wedge d29 \wedge d31 \wedge d33 \wedge d35 \wedge d37$
$S1: d2 \wedge d3 \wedge d6 \wedge d7 \wedge d10 \wedge d11 \wedge d14 \wedge d15 \wedge$
$\quad d18 \wedge d19 \wedge d22 \wedge d23 \wedge d26 \wedge d27 \wedge d30 \wedge d31 \wedge d34 \wedge d35 \wedge d38$
$S2: d4 \wedge d5 \wedge d6 \wedge d7 \wedge d12 \wedge d13 \wedge d14 \wedge d15 \wedge$
$\quad d20 \wedge d21 \wedge d22 \wedge d23 \wedge d28 \wedge d29 \wedge d30 \wedge d31 \wedge d36 \wedge d37 \wedge d38$
$S3: d8 \wedge d9 \wedge d10 \wedge d11 \wedge d12 \wedge d13 \wedge d14 \wedge d15 \wedge$
$\quad d24 \wedge d25 \wedge d26 \wedge d27 \wedge d28 \wedge d29 \wedge d30 \wedge d31$
$S4: d16 \wedge d17 \wedge d18 \wedge d19 \wedge d20 \wedge d21 \wedge d22 \wedge$
$\quad d23 \wedge d24 \wedge d25 \wedge d26 \wedge d27 \wedge d28 \wedge d29 \wedge d30 \wedge d31$
$S5: d32 \wedge d33 \wedge d34 \wedge d35 \wedge d36 \wedge d37 \wedge d38$ Where S0–S5 are the 6 syndrome bits, and d1–d38 are the data/parity bit locations.

As will be understood by those skilled in the art, if the upper data bits are 0, the syndrome calculated for the upper bits will also be 0. For example, when using (7,4) Hamming encoding, d8 through d38 will always be 0 (d8 is a parity bit), so S3–S5 will also always be 0. Therefore, only S0–S2 are available to indicate the bit location for one of the 7 data/parity bits. As always, a syndrome of 000 indicates no error.

For this embodiment, only the comparator 314 needs to be aware of the data word size. The output of the shift register 312 is PDWord [37:0], which is 38 bits wide including 32 bits of data and 6 "parity" bits. The parity bits are calculated by a specific sequence of "Exclusive OR" (XOR) operations commonly used in Hamming Codes. The remapper 316 strips the parity bits out of the incoming data as if the Hamming configuration was always (38,32), however, this will not affect the output in the case of lower data word sizes. Likewise, the syndrome calculator 318 will proceed as if the configuration was always (38,32), however, the upper syndrome bits will be zero for lower data word sizes, as mentioned above. If any of the syndrome bits indicates that a bit in the DWord [31:0] is in error, that specific bit is inverted by the selectable inverter 320 to provide a corrected [31:0] data output stream.

FIG. 4 is a logic diagram illustrating process steps employed for fabricating an integrated circuit that incorporates an OTP module constructed according to the present invention. In step 402, the characteristics of the process that will be used to construct the integrated circuit are determined. Then, the coding level, i.e., the combination of data bits and parity bits, to be implemented is determined in step 404, based on the characterization selected in step 402. In general, the coding level is selected to an appropriate error correction level that will overcome errors related to bad memory cells or other errors related to process and operating variations. In step 406, the integrated circuit is designed to include an OTP module to form a completed integrated circuit design, with the OTP module comprising the various components described hereinabove. In step 408, the code control input is set based on a predetermined coding level. In particular, the code can determine the number of parity bits and data bits that will be enabled. Finally, in step 410, the integrated circuit is manufactured in accordance with the parameters and codes set in the foregoing steps FIG. 5 is a logic diagram illustrating process steps employed for providing host data to a host according to the present invention. In step 502, the OTP module receives a write instruction and encoded host data is received from the coupled host. At step 504, the encoded host data is written to the OTP memory as described above in the discussion related to FIG. 2C. In step 506, encoded host data is read from the OTP memory and the encoded host data is processed in step 508 to correct any errors in the encoded host data to produce corrected host data, again, as described in the discussion related to FIG. 2C. Finally, in step 510, the corrected host data is provided as an output to the coupled host.

While the method and apparatus of the present invention has been described in connection with its various embodiments, it will be understood by those skilled in the art that other embodiments may be derived from the teachings of the present invention without departing from the scope of the claims herein.

The invention claimed is:

1. A one-time-programmable (OTP) module for use within a host integrated circuit, the OTP module, comprising:
   an OTP read only memory (ROM) having a first data width;
   a host interface operably coupled to the host, that receives encoded host data having a second data width from the host integrated circuit and that provides corrected host data to the host integrated circuit;
   write path circuitry operably coupled to the OTP ROM and to the host interface, wherein the write path circuitry receives encoded host data from the host interface and writes the encoded host data to the OTP ROM;
   read path circuitry operably coupled to the OTP ROM and to the host interface, wherein the read path circuitry reads the encoded host data from the OTP ROM, detects errors in the encoded host data, corrects the errors in the encoded host data to produce the corrected host data, and provides the corrected host data to the host interface, wherein the read path circuitry enacts one of a plurality of supported coding schemes in response to a code control input, and wherein the read path circuitry operates to:
      read parallel format encoded host data from the OTP memory at the first data width;
      convert the parallel format encoded host data to serial format encoded host data; and
      convert the serial format encoded host data to parallel format encoded host data at the second data width.

2. A one-time-programmable (OTP) module for use within a host integrated circuit, the OTP module, comprising:
   an OTP read only memory (ROM) having a first data width;
   a host interface operably coupled to the host, that receives encoded host data having a second data width from the host integrated circuit and that provides corrected host data to the host integrated circuit;
   write path circuitry operably coupled to the OTP ROM and to the host interface, wherein the write path circuitry receives encoded host data from the host interface and writes the encoded host data to the OTP ROM; wherein the write path circuitry operates to:
      convert parallel format encoded host data at the second data width to serial format encoded host data;
      convert the serial format encoded host data to parallel format encoded host data at the first data width; and
      write the parallel format encoded host data to the OTP ROM at the first data width; and
   read path circuitry operably coupled to the OTP ROM and to the host interface, wherein the read path circuitry reads the encoded host data from the OTP ROM, detects errors in the encoded host data, corrects the errors in the encoded host data to produce the corrected host data, and provides the corrected host data to the host interface, wherein the read path circuitry enacts one of a plurality of supported coding schemes in response to a code control input.

* * * * *